Feb. 16, 1932.  J. L. WATSON  1,845,372
METER PROTECTIVE DEVICE
Filed Feb. 10, 1930
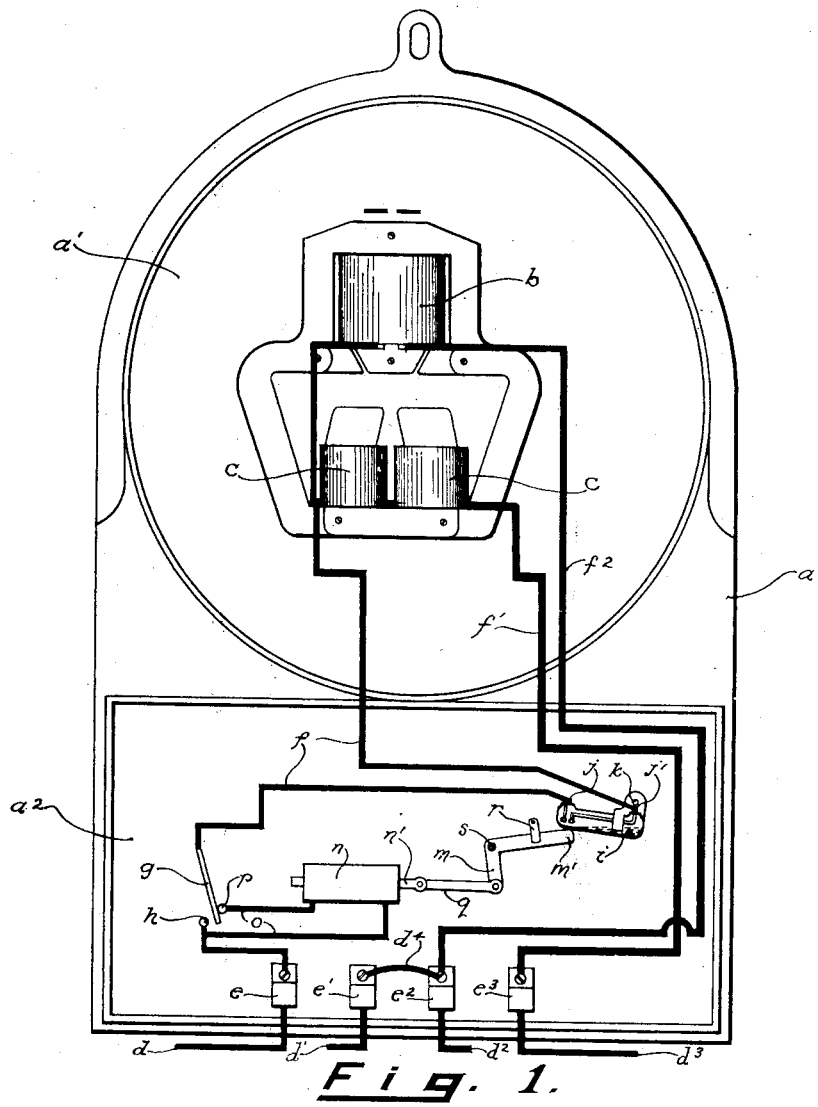
Fig. 1.
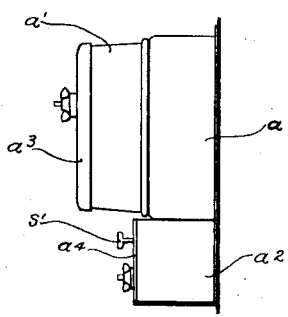
Fig. 2.
INVENTOR
James L. Watson
BY 
ATTORNEY Patented Feb. 16, 1932

1,845,372

UNITED STATES PATENT OFFICE

JAMES L. WATSON, OF VANCOUVER, WASHINGTON

METER PROTECTIVE DEVICE

Application filed February 10, 1930. Serial No. 427,402.

My invention relates to means for protecting metered circuits, such for example as the lighting and heating circuits in residences. Code requirements specify that the fuses and other protective devices for such circuits be housed in steel outlet boxes. If two separate circuits are provided in installations such as these, such for example as 220 volt circuits for an electric range and 110 volt circuits for lighting, it is necessary to duplicate the installation of steel outlet boxes and meters and a charge is made to the user, which charge represents an appreciable portion of the purchase price of the electrical appliance installed.

For example, in range installations a charge of thirty-five dollars is made by local operating companies and electrical contractors for the material used in providing such additional equipment and such additional charge is a factor of substantial importance in retarding the sale of equipment of this character. It is the standard and substantially uniform practice to provide separate meters for each of these local circuits and such meters are housed in a steel casing divided into two chambers, one for the coils and operating mechanism of the meter and the other chamber housing the terminals therefor.

The object of my invention is to provide a convenient arrangement of fuses or other protective devices, which arrangement adapts such protective devices to be housed in one of such chambers and preferably the terminal chamber of an electrical meter, thus to eliminate the expense incurred in installing such equipment in a separate outlet box or casing. I consider it preferable that an automatic circuit breaker be provided for this purpose and that such circuit breaker be arranged within the terminal chamber of such meter casing, thus permitting such protective devices to be operated upon without requiring that the main portion of such casing be opened.

The details of construction and the mode of operation of my invention are hereinafter described with reference to the accompanying drawings, in which:

Fig. 1 is a front elevation of a standard watt hour meter having my invention incorporated therein, being somewhat diagrammatic in nature and with the front wall of the casing shown as having been removed; and Fig. 2 is a side elevation of such improved meter.

The standard form of meter provided in installations of the character referred to is a watt hour meter and such meters are housed within an open faced casing $a$, which latter is divided into two chambers, one $a'$ being circular in section and housing the coils and operating mechanism of the meter and the other $a2$ normally housing the terminals for the wire connections. Each chamber is sealed from the other and the chamber $a'$ is covered by a removable face plate or cover $a3$ and the chamber $a2$ is covered by a removable face plate or cover $a4$.

In the drawings, I have attempted to show diagrammatically the electrical connections and apparatus of such meter, but have not shown the metering mechanism, the details of which play no part in my invention. Housed within the chamber $a'$ are the voltage coils $b$ and the current coils $c$. The line side of the electric circuit measured by such meter is indicated by the two wires $d$—$d'$ and the load side of the circuit by the two wires $d2$ and $d3$. Such wires are fastened to terminals $e$, $e'$, $e2$ and $e3$ respectively, which latter are located within the chamber $a2$. The wires $d'$ and $d2$ are connected by the shunt connection $d4$, which connection also is arranged within the housing $a2$.

Connected to the wire $d$ thru the terminal $e$ is an electric connection $f$ to which connection the coils $b$ and $c$ are connected at one end. The opposite end of the coils $c$ is connected by a wire $f'$ to the terminal $e3$ and the opposite end of the coil $b$ is connected by the wire $f2$ to the terminal $e2$. Electrically connected in the wire $f$ and constituting a part thereof, is a bimetallic strip $g$ fixed at one end and free at the other, such latter end being adapted normally to contact with a point $h$ under normal running conditions. Also arranged in such wire $f$ is a movable switch $i$ preferably of the mercury type, in which two terminals $j$ and $j'$ are arranged normally to lie below the surface of a pool of mercury contained in such tubular switch when such tube extends generally in a horizontal plane. Such tube is pivotally mounted at $k$ and the opposite end of such tube rests upon the branch $m'$ of a bell crank lever $m$.

A trip coil $n$ is arranged in the branch $o$ of the connection $f$ and such branch $o$ is normally open adjacent a contact point $p$. Such contact point $p$ is arranged adjacent the point $h$ in the connection $f$ and is located relatively to the free or movable end of the bimetallic strip $g$. An increase in wattage beyond a predetermined minimum causes such bimetallic strip $g$ to become overheated and because of its characteristic to flex towards the right as shown in Fig. 1, in moving it leaves contact with point $h$ and makes contact with point $p$. This causes current to flow thru the branch circuit $o$, which includes the trip coil $n$. Such coil is wound so that when current flows therethru the plunger $n'$ therein is moved towards the right in Fig. 1 and acts thru link $q$ to rock the bell crank $m$ counterclockwise about its pivot on the shaft $s$ to tip the mercury tube $i$ out of a horizontal plane and into an oblique plane and to break the circuit therethru. The bell crank $m$ is arranged with a catch $r$ tending to hold the same in set position until manually released.

The shaft $s$ upon which such bell crank lever is fixed extends outwardly thru the cover $a4$ and terminates in a key-shaped end $s'$. Thus when such overload condition has been corrected, the circuit can be again closed manually by manipulating such exteriorly projecting key end $s'$. This permits the bell crank lever to be returned from the position it assumes in Fig. 1 and to release the mercury tube so that it will return to a horizontal plane. In such position the terminals $j$—$j'$ therein will be arranged below the surface of the pool of mercury contained in such tube to close the circuit thru the connection $f$.

I consider it preferable that an automatic circuit breaker be provided having a current responsive motor agency with an exteriorly arranged manual control element, for the reason that the switch can be actuated without requiring that the removable cover be displaced. Inasmuch as the removable portions of the meter are preferably sealed in place to prevent unauthorized interference with the operating portions of such meter, the removal of such cover for replacement of fuse elements would require sealing in each instance.

I claim:

In an electric watthour meter, a casing, housing an electric circuit including a voltage coil and an amperage coil, such coils being joined together at one end and separated at the other, an automatic protective circuit control apparatus, such apparatus including a bi-metallic strip arranged in such circuit and adapted for movement under the influence of the flow of current in excess of a predetermined quantity, a branch circuit including the coils of an electro-magnet leading from the point of jointure of such meter coils and terminating at a point normally in spaced relation with respect to such bi-metallic strip, a switch element adapted for actuation by such electro-magnet, and independent means having a portion extending through one wall of said casing, also being adapted to actuate said switch.

In testimony whereof he has affixed his signature.

JAMES L. WATSON.